United States Patent
Smelyansky

(10) Patent No.: US 9,258,420 B2
(45) Date of Patent: Feb. 9, 2016

(54) SOFTWARE-BASED OPERATOR SWITCHBOARD

(75) Inventor: Vladimir Smelyansky, Glenview, IL (US)

(73) Assignee: XCAST LABS, Inc., Northfield, IL (US)

( * ) Notice: Subject to any disclaimer, the term of this patent is extended or adjusted under 35 U.S.C. 154(b) by 621 days.

(21) Appl. No.: 12/719,675

(22) Filed: Mar. 8, 2010

(65) Prior Publication Data

US 2010/0232584 A1 Sep. 16, 2010

Related U.S. Application Data

(60) Provisional application No. 61/159,156, filed on Mar. 11, 2009.

(51) Int. Cl.
*H04M 3/51* (2006.01)

(52) U.S. Cl.
CPC .................................. *H04M 3/5133* (2013.01)

(58) Field of Classification Search
CPC .......... H04M 3/5133; H04M 2201/60; H04M 3/42382; H04M 3/5307; H04M 2203/4536
USPC ........... 379/67.1, 88.01–88.04, 88.14, 93.17, 379/265.02; 705/37
See application file for complete search history.

(56) References Cited

U.S. PATENT DOCUMENTS

| | | | |
|---|---|---|---|
| 5,537,141 A | 7/1996 | Harper et al. | |
| 5,823,788 A | 10/1998 | Lemelson et al. | |
| 5,850,250 A | 12/1998 | Konopka et al. | |
| 6,288,753 B1 | 9/2001 | DeNicola et al. | |
| 6,646,673 B2 | 11/2003 | Caviedes et al. | |
| 6,868,140 B2 | 3/2005 | Myers et al. | |
| 7,209,964 B2 | 4/2007 | Dugan et al. | |
| 7,340,246 B1 | 3/2008 | Kanerva et al. | |
| 7,353,256 B2 | 4/2008 | Delaney et al. | |
| 7,558,853 B2 | 7/2009 | Alcorn et al. | |
| 8,139,752 B2 * | 3/2012 | Darby | 379/265.02 |
| 2002/0087560 A1 | 7/2002 | Bardwell | |
| 2014/0258076 A1 * | 9/2014 | Louie et al. | 705/37 |

OTHER PUBLICATIONS

International Search Report issued in PCT/US2010/026679, dated May 4, 2010.

* cited by examiner

*Primary Examiner* — Md S Elahee
(74) *Attorney, Agent, or Firm* — Smith, Gambrell & Russell, LLP

(57) ABSTRACT

A system and computer program product for providing a software-based operator switchboard for a phone system provide improved functionality, with greater simplicity, than conventional techniques. A telecommunications system may comprise an operator switchboard computer system displaying and receiving input with a graphical user interface indicating an operation to be performed by an end-user device, generating a first message in a first message format based on the received input, and transmitting the message to a server computer system, and a server computer system receiving the first message from the first computer system, translating the first message from the first message format to form at least one second message in a second message format, and transmitting the second message to perform the operation to be performed by at least one end-user device. Messages may also be transmitted from end-user devices to the server computer system, translated, and transmitted to the operator switchboard computer system.

10 Claims, 5 Drawing Sheets

SOFTWARE-BASED OPERATOR SWITCHBOARD

CROSS-REFERENCE TO RELATED APPLICATIONS

This application claims the benefit of Provisional Application No. 61/159,156, filed Mar. 11, 2009, the contents of which are incorporated herein in their entirety.

BACKGROUND OF THE INVENTION

1. Field of the Invention

The present invention relates to a method, system, and computer program product for providing a software-based operator switchboard for a phone system.

2. Description of the Related Art

Currently there are a number of hardware-based Public-Switched Telephone Network (PSTN) and Voice over Internet Protocol (VoIP) managed switchboards for phone systems. Such conventional devices typically exchange complex messages between a signaling device and a server. For example, SIP-based devices must currently exchange complicated SIP messages, which travel between the signaling device and the central server. Traditional hardware-based switchboards have limited functionality and must execute complicated instructions—such as interception, send to voicemail, etc. A need arises for an improved switchboard implementation that can provide improved functionality, with greater simplicity, than conventional techniques.

SUMMARY OF THE INVENTION

A method, system, and computer program product for providing a software-based operator switchboard for a phone system provide improved functionality, with greater simplicity, than conventional techniques. Because there is no genuine need for processing most of the complicated message that are processed by conventional techniques, these messages can be reduced to a smaller subset of much simpler messages. These messages are easier to send, easier to parse, and easier to process. Replaces the conventional hardware switchboard with a software implementation provides improved functionality and flexibility. Likewise, replacing complex messaging, such as SIP-messaging, with more efficient and precise messages designed to address specific functionality also provides improved functionality and simplicity. As a result, cost advantages are provided since expensive hardware equipment is no longer required, and improved functionality is provided by displaying more, and improved, information to the user.

For example, a telecommunications system may comprise a first computer system comprising a processor operable to execute computer program instructions, a memory operable to store computer program instructions executable by the processor, and computer program instructions stored in the memory and executable to perform the steps of displaying a graphical user interface comprising information and controls implementing a telecommunications system operator switchboard, receiving input with the graphical user interface, the input indicating an operation to be performed by at least one end-user device of the telecommunications system, generating at least one first message in a first message format based on the received input, and transmitting the at least one message to a second computer system; and a second computer system comprising a processor operable to execute computer program instructions, a memory operable to store computer program instructions executable by the processor, and computer program instructions stored in the memory and executable to perform the steps of receiving the at least one first message from the first computer system, translating the at least one first message from the first message format to form at least one second message in a second message format, and transmitting the at least one second message to perform the operation to be performed by at least one end-user device of the telecommunications system.

The second computer system may further perform the steps of receiving at least one third message in the second message format from at least one end-user device of the telecommunications system, translating the at least one third message from the second message format to form at least one fourth message in the first message format, and transmitting the at least one fourth message to the first computer system; and the first computer system may further perform the steps of receiving the at least one fourth message from the second computer system, and displaying information with the graphical user interface, performing an operation with the telecommunications system, or both, based on the fourth message.

The second message format may be Session Initiation Protocol, Session Description Protocol, or a combination of Session Initiation Protocol and Session Description Protocol.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

A method, system, and computer program product for providing a software-based operator switchboard for a phone system provide improved functionality, with greater simplicity, than conventional techniques. Because there is no genuine need for processing most of the complicated message that are processed by conventional techniques, these messages can be reduced to a smaller subset of much simpler messages. These messages are easier to send, easier to parse, and easier to process. Replaces the conventional hardware switchboard with a software implementation provides improved functionality and flexibility. Likewise, replacing complex messaging, such as SIP-messaging, with more efficient and precise messages designed to address specific functionality also provides improved functionality and simplicity. As a result, cost advantages are provided since expensive hardware equipment is no longer required, and improved functionality is provided by displaying more, and improved, information to the user.

Figure 1:
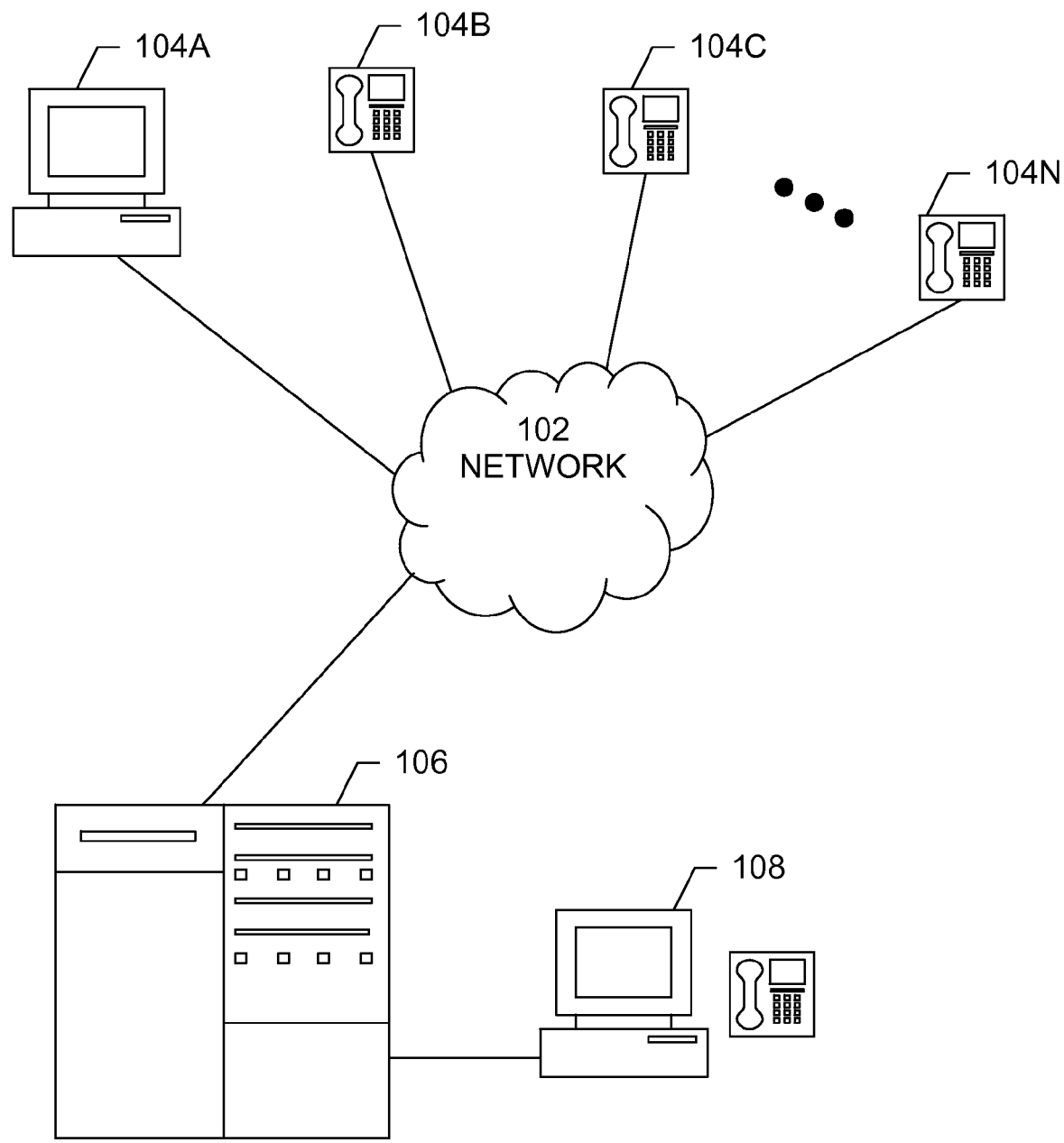
FIG. 1 is an exemplary diagram of block diagram of a network system in which the present invention may be implemented.

As an example, such features may be provided in a network system 100, such as that shown in FIG. 1. FIG. 1 shows a network 102, a plurality of end user devices 104A-N, a server 106, and an operator switchboard workstation 108. Network 102 typically is, or includes the Internet, but may include any communications network that is now in service or which may be developed in the future. Such a network may include one or more public or private communications networks, such as the Internet, wired or wireless telephone networks, wired or wireless data networks, local area networks, etc. End user devices 104A-N include any device capable of transmitting audio and/or video to an end user, such as a hardware telephone, such as telephone 104B, or a software based phone client running on a computer system, such as computer system 104A. End user devices 104A-N are capable of transmitting and receiving messages with server 106. These messages may cause the end user devices 104A-N and/or server 106 to perform one or more operations. Server 106 is a server computer system that keeps track of all end user devices, generates, and sends appropriate broadcast messages. Server 106 may be included in, or connected to, a telephone Private Branch Exchange (PBX), a telephone Central Office (CO), a Voice-over-Internet Protocol (VoIP) switch, etc. Server 106 includes translation software that translates between messages that are transmitted to and received from end user devices 104A-N and messages that are transmitted to and received from operator switchboard workstation 108. Operator switchboard workstation 108 displays information to and receives input from an operator using operator switchboard workstation 108. Operator switchboard workstation 108 receives user input and, in response, generates and transmits messages to server 106 to cause the server and/or one or more end user devices 104A-N to perform one or more operations. Likewise, operator switchboard workstation 108 receives messages from server 106, parses and processes the messages, and, in response, displays information to the operator and/or performs one or more operations. For example, operator switchboard workstation 108 displays information, such as the call and/or device status, and provides the capability to initiate a call, transfer a call, etc. In addition, operator switchboard workstation 108 typically includes, or is associated with, an operator telephone extension.

Figure 2:
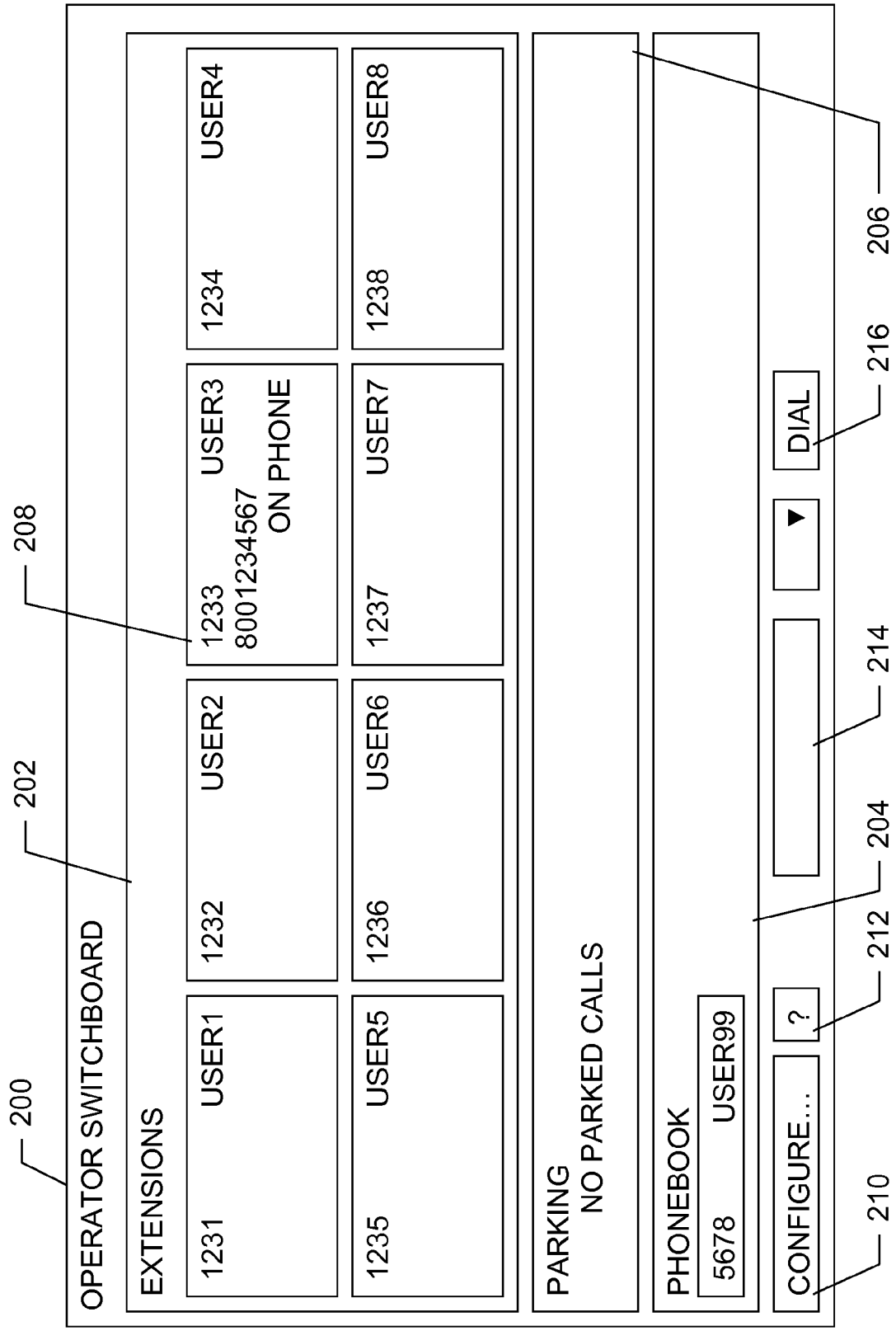
FIG. 2 is an exemplary diagram of graphical user interface (GUI) displayed by an operator switchboard workstation.

FIG. 2 is an exemplary diagram of graphical user interface (GUI) displayed by an operator switchboard workstation 108, shown in FIG. 1. In this example, the GUI includes operator switchboard window 200, which includes a number of panes, such as extensions pane 202, parking pane 204, and phonebook pane 206. Extensions pane 202 includes a sub-pane for each extension being displayed, such as sub-pane 208. Each sub-pane may include information about an extension and may further indicate the status of that extension. For example, sub-pane 208 includes the information that extension 1233 is assigned to user3 and further indicates that that extension is in use and connected to telephone number 8001234567. This provides the capability to the identity of both called and calling parties, by name, phone number, user ID, Caller ID, etc. "at a glance." Parking pane 206 includes information about parked calls, and phonebook pane 204 includes information about the operator's phonebook. In addition, GUI 200 includes a number of controls, such as configure button 210, help button 212, and dial box 214 and dial button 216. Configure button 210 provides access to one or more configuration windows, providing the capability to configure operator switchboard window 200 and/or the telephone system controlled by the operator switchboard. Help button 212 provides access to the help system for the operator switchboard. Dial box 214 accepts input of a phone number that the operator wants to dial, and dial button 216 provides the capability to dial that phone number, or another selected or indicated phone number, such as from the phonebook. Other exemplary functions that may be provided include the capability to transfer a call from one extension to another and to send a call to voicemail without actually answering it on the operator telephone extension.

Operator switchboard window 200 may be implemented using any software technology. For example, operator switchboard window 200 may be implemented using a standard information transfer protocol, such as Hypertext Transfer Protocol (HTTP) or Hypertext Transfer Protocol Secure (HTTPS), and displayed using any standard browser, such as INTERNET EXPLORER®, FIREFOX®, etc. Alternatively, operator switchboard window 200 may be implemented using custom or semi-custom application software and/or using a special purpose protocol.

Figure 3:
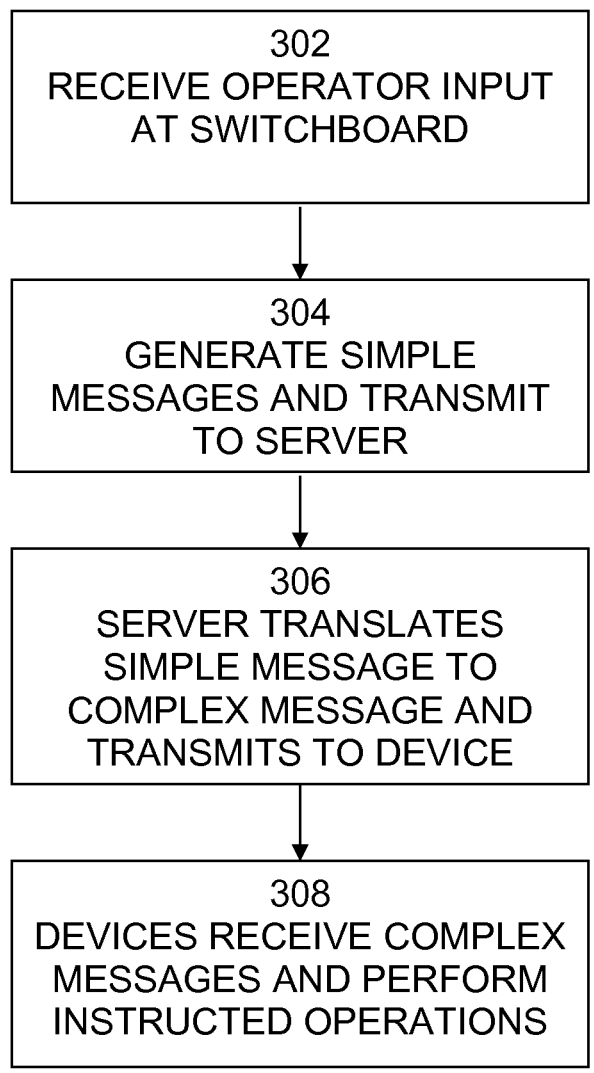
FIG. 3 is an exemplary flow diagram of a process of switchboard to device message processing.

An exemplary flow diagram of a process 300 of switchboard to device message processing is shown in FIG. 3. It is best viewed in conjunction with FIG. 1. Process 300 begins with step 302, in which operator switchboard workstation 108 receives input from an operator. Typically, such input is received from the operator using operator switchboard screen 200, shown in FIG. 2. Such input may include one or more commands or operation selections, such as those described below. In step 304, operator switchboard workstation 108 generates a "simple" message based on the input is received from the operator and transmits the simple message to server 106. Typically, such messages include indications of one or more end-user devices that are to perform operations. In step 306, server 106 translates the simple message to a "complex" message and transmits the complex message to the indicated end-user devices. Server 106 may be responsible for performing the indicated operations, for example, setting up and connecting a call, or for performing any other call processing associated with the input from the operator switchboard workstation 108. Alternatively, another server or a phone switch may be responsible for the call processing associated with the input from the operator switchboard workstation 108. Server 106 may include a proxy that performs the conversion between the simple and complex messages and protocols. Examples of complex message formats and protocols that may be used include Session Initiation Protocol (SIP), Session Description Protocol (SDP), and a combination of SIP and SDP. An example of simple messages and protocol is described below. Of course, other messages and protocols may be used instead of, or in addition to, the described complex and simple messages and protocols. In step 308, the end-user devices receive the complex messages and perform the instructed operations.

Figure 4:
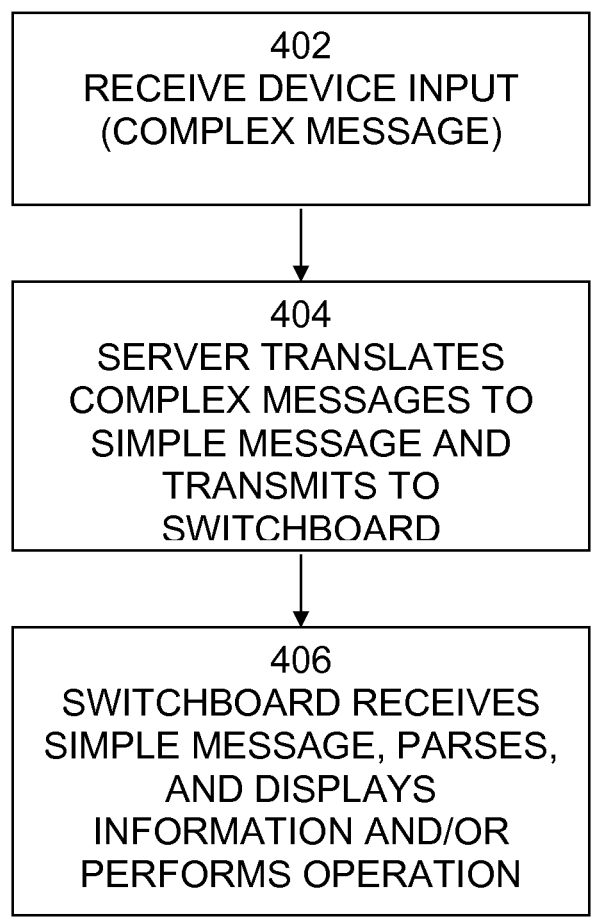
FIG. 4 is an exemplary flow diagram of a process of device to switchboard message processing.

An exemplary flow diagram of a process 400 of device to switchboard message processing is shown in FIG. 4. It is best viewed in conjunction with FIG. 1. Process 400 begins with step 402, in which server 106 receives input from an end-user device 104A-N. Typically, this input is in the form of one or messages using a complex format and protocol. For example, an end-user device, such as a telephone, may be used to place a call to another telephone by dialing the phone number of the called telephone. The end-user device would transmit the appropriate complex messages to server 106 indicating initiation of such a call. Server 106 may be responsible for setting up and connecting this call, or for performing any other call processing associated with the input from the end-user device. Alternatively, another server or a phone switch may be responsible for setting up and connecting the call. In step 404, server 106 translates the received complex messages into one or more simple messages and transmits the simple messages to operator switchboard workstation 108. Server 106 may include a proxy that performs the conversion between the simple and complex messages and protocols.

Examples of complex messages and protocols that may be used include Session Initiation Protocol (SIP), Session Description Protocol (SDP), and a combination of SIP and SDP. An example of simple messages and protocol is described below. Of course, other messages and protocols may be used instead of, or in addition to, the described complex and simple messages and protocols. In step 406, operator switchboard workstation 108 receives the simple messages, parses the messages, and displays the appropriate information and/or performs the instructed operations.

Examples of operations involving the operator switchboard are described below:

An end-user device may initiate a call. For example, an IP telephone may initiate a call by transmitting a SIP INVITE message to the server, such as the example shown below:

```
INVITE sip:18475551234@siptalk.xcastlabs.com SIP/2.0
Via: SIP/2.0/UDP 38.102.250.16:7064;branch=z9hG4bK-middle-13620767-101.0
Via: SIP/2.0/UDP 10.10.10.119:5060;branch=z9hG4bK76a4ca56
From: "Vlad"
<sip:4248@siptalk.xcastlabs.com>;tag=003094c38411f0f3638b603d-7991129c
To: <sip:18475551234@siptalk.xcastlabs.com>
Contact:
<sip:4248*siptalk.xcastlabs.com-66.153.122.24+1030@38.102.250.16:7064>
Call-ID: 003094c3-8411006c-6b5c23d9-60ca4caf@10.10.10.119
CSeq: 101 INVITE
Expires: 180
Max-Forwards: 70
User-Agent: Cisco-CP7960G/8.0
Content-Type: application/sdp
Content-Length: 309
Date: Wed, 03 Mar 2010 16:40:22 GMT
Accept: application/sdp
Allow: ACK,BYE,CANCEL,INVITE,NOTIFY,OPTIONS,REFER,REGISTER,UPDATE
Supported: replaces,join,norefersub
Content-Disposition: session;handling=optional
v=0
o=Cisco-SIPUA 18406 0 IN IP4 10.10.10.119 s=SIP Call t=0 0 m=audio 26904
    RTP/AVP 0 8 18 101 c=IN IP4 66.153.122.24 a=rtpmap:0 PCMU/8000
a=rtpmap:8 PCMA/8000
a=rtpmap:18 G729/8000
a=fmtp:18 annexb=no
a=rtpmap:101 telephone-event/8000
a=fmtp:101 0-15
a=sendrecv
a=tool:middle-GHqZQncKCgoYaQAA
```

The server translates this SIP INVITE message into a simpler message, such as "INVITE 4248, 18475551234, Caller Name", and transmits this simpler message to the operator switchboard. The operator switchboard receives this message and displays the information that device 4248 is dialing to 18475551234 and the caller name. Throughout the call, either server 106 or another server or telephone switch performs the call set up requested by the SIP INVITE message independently of the generation and transmission of the message to the operator switchboard.

The actual ringing of dialed phone is indicated by a SIP RINGING message, such as:

```
SIP/2.0 183 Ringing
Via: SIP/2.0/UDP 66.153.122.27:5060;branch=z9hG4bK-xcast-Qt0LCOTP1n.0
Via: SIP/2.0/UDP 38.102.250.16:7064;branch=z9hG4bK-middle-13620767-102.0
Via: SIP/2.0/UDP 10.10.10.119:5060;branch=z9hG4bK30810b7f
Record-Route: <sip:38.102.250.50:5060;lr>
Record-Route:
<sip:4248@66.153.122.27:5060;lr;xft=003094c38411f0f3638b603d-7991129c>
From: "Vladimir Smelyansky"
```

-continued

```
<sip:7735550322@siptalk.xcastlabs.com>;
    tag=003094c38411f0f3638b603d-7991129c
To:
<sip:18475551234@siptalk.xcastlabs.com>;tag=xtg-40178-18446744073676515892
Contact: <sip:18475551234@38.102.250.25:5060>
Call-ID: 003094c3-8411006c-6b5c23d9-60ca4caf@10.10.10.119
CSeq: 102 INVITE
Server: XCast Carrier/1.0
Content-Type: application/sdp
Content-Length: 235
v=0
o=Sonus_UAC 6967 24368 IN IP4 208.69.81.62 s=SIP Media
Capabilities c=IN
```

-continued

```
IP4 208.69.81.53 t=0 0 m=audio 27148 RTP/AVP 0 101 a=rtpmap:0
    PCMU/8000
a=rtpmap:101 telephone-event/8000
a=fmtp:101 0-15
a=sendrecv
a=maxptime:20
```

The server translates this SIP RINGING message into a simpler message, such as "RINGING 7735550322, 18475551234", and transmits this simpler message to the operator switchboard. The operator switchboard receives this message and displays information that the dialed phone is ringing.

When the called party answers the call, a message indicating this will be sent, such as:

```
SIP/2.0 200 OK
Via: SIP/2.0/UDP 38.102.250.16:7064;branch=z9hG4bK-middle-13620767-102.0
Via: SIP/2.0/UDP 10.10.10.119:5060;branch=z9hG4bK30810b7f
Record-Route: <sip:38.102.250.50:5060;lr>
```

```
Record-Route:
  <sip:7735550322@66.153.122.27:5060;lr;
      xft=003094c38411f0f3638b603d-7991129c>
From: "Vladimir Smelyansky"
  <sip:4248@siptalk.xcastlabs.com>;tag=003094c38411f0f3638b603d-
      7991129c
To:
  <sip:18475551234@siptalk.xcastlabs.com>;tag=xtg-40178-
      18446744073676515892
Contact: <sip:18475551234@38.102.250.25:5060>
Call-ID: 003094c3-8411006c-6b5c23d9-60ca4caf@10.10.10.119
CSeq: 102 INVITE
Server: XCast Carrier/1.0
Content-Type: application/sdp
Content-Length: 235
v=0
o=Sonus_UAC 6967 24368 IN IP4 208.69.81.62 s=SIP Media
  Capabilities c=IN
      IP4 208.69.81.53 t=0 0 m=audio 27148 RTP/AVP 0 101 a=rtpmap:0
      PCMU/8000
a=rtpmap:101 telephone-event/8000
a=fmtp:101 0-15
a=sendrecv
a=maxptime:20
```

The server translates this message into a simpler message, such as "ANSWERED 7735550322, 18475551234", and transmits this simpler message to the operator switchboard. The operator switchboard receives this message and displays the information that the call was answered.

The end of the call is indicated by a SIP BYE message from one of the end points, such as:

```
BYE
sip:4248*siptalk.xcastlabs.com-66.153.122.24+1030@38.102.250.16:
  7064
SIP/2.0
Via: SIP/2.0/UDP 38.102.250.50:5060;branch=z9hG4bK-xcast-
  EYMYFMGPPP.0
Via: SIP/2.0/UDP 38.102.250.25:5060;branch=z9hG4bK-xcarrier-
      6242011215895426
Route:
  <sip:4248@66.153.122.27:5060;lr;xft=003094c38411f0f3638b603d-
      7991129c>
From:
  <sip:18475551234@siptalk.xcastlabs.com>;tag=xtg-40178-
      18446744073676515892
To: "Vladimir Smelyansky"
  <sip:7735550322@siptalk.xcastlabs.com>;
      tag=003094c38411f0f3638b603d-7991129c
Contact: <sip:18475551234@38.102.250.25:5060>
Call-ID: 003094c3-8411006c-6b5c23d9-60ca4caf@10.10.10.119
CSeq: 201 BYE
User-Agent: XCast Carrier/1.0
Content-Length: 0
```

The server translates this message into a simpler message, such as "BYE 4248, 18475551234", and transmits this simpler message to the operator switchboard. The operator switchboard receives this message and displays the information that the call has ended.

There are also some messages that are communicated between devices that the operator switchboard may not need to receive, depending upon the configuration of the operator switchboard and any options selected for the operator switchboard. For example:

```
SIP/2.0 100 Trying
Via: SIP/2.0/UDP 66.153.122.27:5060;branch=z9hG4bK-xcast-
  Qt0LCOTP1n.0
Via: SIP/2.0/UDP 38.102.250.16:7064;branch=z9hG4bK-middle-
  13620767-102.0
Via: SIP/2.0/UDP 10.10.10.119:5060;branch=z9hG4bK30810b7f
From: "Vladimir Smelyansky"
  <sip:7735550322@siptalk.xcastlabs.com>;
      tag=003094c38411f0f3638b603d-7991129c
To: <sip:18475551234@siptalk.xcastlabs.com>
Call-ID: 003094c3-8411006c-6b5c23d9-60ca4caf@10.10.10.119
CSeq: 102 INVITE
Server: XCast Partner/1.1
Content-Length: 0
```

This is an example of an intermediate message that is needed for end point end-user device, but which may not be needed by the operator switchboard. This message indicates that the system is still trying to reach the called party. Another example of a message that may not be needed by the operator switchboard is:

```
SIP/2.0 407 Proxy Authentication Required
Via: SIP/2.0/UDP 38.102.250.16:7064;branch=z9hG4bK-middle-
  13620767-101.0
Via: SIP/2.0/UDP 10.10.10.119:5060;branch=z9hG4bK76a4ca56
From: "Vlad"
  <sip:4248@siptalk.xcastlabs.com>;
  tag=003094c38411f0f3638b603d-
  7991129c
To: <sip:18475551234@siptalk.xcastlabs.com>;tag=auth-158956520
Call-ID: 003094c3-8411006c-6b5c23d9-60ca4caf@10.10.10.119
CSeq: 101 INVITE
Proxy-Authenticate: Digest realm="XCAST",
  nonce="2fbee9d21e397693f3903cbbc5c01389"
Server: XCast VGProxy/1.2
Content-Length: 0
```

This is an example of a security related message, in which the server needs to confirm that particular device is allowed to make a call. Other type of messages that may not be needed by the operator switchboard include protocol-related messages. Many SIP implementations are User Datagram Protocol (UDP) based. UDP doesn't provide reliability of message delivery features. As a result, message delivery reliability features, such as acknowledging messages that are successfully received must be provided using SIP. An example of such a message is:

```
ACK sip:18475551234@38.102.250.25:5060 SIP/2.0
Via: SIP/2.0/UDP 38.102.250.16:7064;branch=z9hG4bK-middle-13620767-102.1
Via: SIP/2.0/UDP 10.10.10.119:5060;branch=z9hG4bK680fc888
Route:
  <sip:7735550322@66.153.122.27:5060;lr;xft=003094c38411f0f3638b603d-
      7991129c>
Route: <sip:38.102.250.50:5060;lr>
From: "Vladimir Smelyansky"
  <sip:4248@siptalk.xcastlabs.com>;tag=003094c38411f0f3638b603d-7991129c
```

-continued

```
To:
 <sip:18475551234@siptalk.xcastlabs.com>;tag=xtg-40178-
     18446744073676515892
 Call-ID: 003094c3-8411006c-6b5c23d9-60ca4caf@10.10.10.119
 CSeq: 102 ACK
 Max-Forwards: 70
 User-Agent: Cisco-CP7960G/8.0
 Content-Length: 0
 Date: Wed, 03 Mar 2010 16:40:31 GMT
 Proxy-Authorization: Digest
 username="a4248",realm="XCAST",uri="sip:18475551234@siptalk.xcastlabs.com",
     response="8a261e8a3
 71da4a49253c9c9af6a708d", nonce="2fbee9d21e397693f3903cbbc5c01389",
     algorithm=md5
```

If a more sophisticated protocol, such as Transmission Control Protocol (TCP) is used, then reliability features are provided by TCP and it is not necessary to implement such features in SIP.

The messages described above are merely examples of messages that may, or may not, be handled by the operator workstation. The full number of messages that may, or may not, be handled by the operator workstation is far too large to fully describe here. However, the present invention contemplates any and all such messages.

Figure 5:
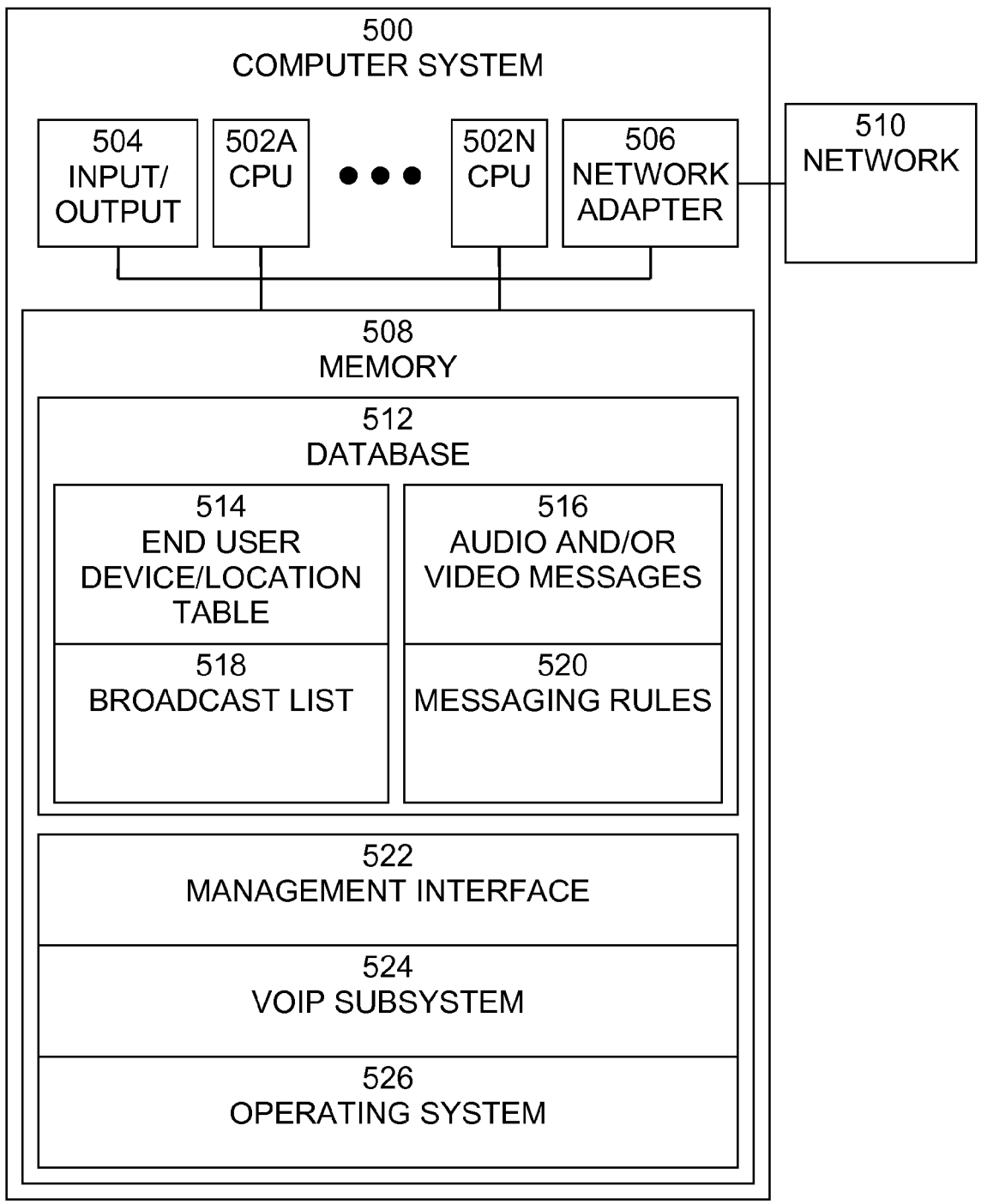
FIG. 5 is an exemplary block diagram of a computer system, such as a server or switchboard computer, in which the present invention may be implemented.

An exemplary block diagram of a computer system 500, such as a server or an operator switchboard workstation, is shown in FIG. 5. Computer system 500 is typically a programmed general-purpose computer system, such as a personal computer, workstation, server system, and minicomputer or mainframe computer. Computer system 500 includes one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present invention also contemplates embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces device 500 with network 510. Network 510 includes any communications network that is now in service or which may be developed in the future. Such a network may include one or more public or private communications networks, such as the Internet, wired or wireless telephone networks, wired or wireless data networks, local area networks, etc.

Memory 508 stores program instructions that are executed by, and data that are used and processed by, CPU 502 to perform the functions of computer system 500. Memory 508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface, or Serial AT Attachment (SATA), or a variation or enhancement thereof.

The contents of memory 508 varies depending upon the function that computer system 500 is programmed to perform. For example, where computer system 500 is a server, memory 508 may include call processing routines 512 and associated data and message translation proxy 514. Call processing routines 512 and associated data provide call processing and control functions such as setting up and connecting calls, detecting call progress conditions, forwarding calls, etc. Such call processing may be performed in conjunction with an external switch or server, or the call processing may be integrated with the computer system 500. Message translation proxy 514 performs the conversion between the simple and complex messages and protocols. Examples of complex message formats and protocols that may be used include Session Initiation Protocol (SIP), Session Description Protocol (SDP), and a combination of SIP and SDP. An example of simple messages and protocol is described above. Of course, other messages and protocols may be used instead of, or in addition to, the described complex and simple messages and protocols. The message translation functionality may be implemented as a proxy in a server that also handles call processing, as shown in the example of FIG. 5, or the message translation functionality may be implemented using any other architecture or arrangement.

As another example, where computer system 500 is an operator switchboard workstation, memory 508 may include switchboard GUI routines 516 and message processing routines 518. Switchboard GUI routines 516 provide the capability for an operator switchboard workstation to display information to and receive input from an operator using the operator switchboard workstation. Message processing routines 518 provide the capability to generate and transmit messages to the server based on operator input to the GUI, and to receive messages from the server, parse and process the messages, and, in response, display information to the operator with the GUI, and/or perform one or more other operations.

Operating system 520 provides overall system functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable storage media include, floppy disks, hard disk drives, CD-ROMs, DVDROMs, RAM, flash memory, etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A telecommunications system comprising:
    a first computer system comprising a processor operable to execute computer program instructions, a memory operable to store computer program instructions executable by the processor, and computer program instructions stored in the memory and executable to perform the steps of:
        displaying a graphical user interface comprising information and controls implementing a telecommunications system operator switchboard displaying information relating to Session Initiation Protocol end-user devices of the telecommunications system and the controls controlling operation of a plurality of end-user devices of the telecommunications system,
        receiving input with the graphical user interface, the input indicating an operation to be performed by at least Session Initiation Protocol one end-user device of the plurality of Session Initiation Protocol end-user devices,
        in response to receiving the input, generating at least one first message in a first non-standard or proprietary simple message format other than Session Initiation Protocol, Session Description Protocol, or a combination of Session Initiation Protocol and Session Description Protocol based on the received input, the least one first message indicating the operation and at least one Session Initiation Protocol end-user device to perform the operation and representing a message in Session Initiation Protocol, Session Description Protocol, or a combination of Session Initiation Protocol and Session Description Protocol, and transmitting the at least one message to a second computer system; and
    a second computer system comprising a processor operable to execute computer program instructions, a memory operable to store computer program instructions executable by the processor, and computer program instructions stored in the memory and executable to perform the steps of:
        receiving the at least one first message from the first computer system,
        translating the at least one first message from the first message format to form at least one second message in a second message format, the second message format being Session Initiation Protocol, Session Description Protocol, or a combination of Session Initiation Protocol and Session Description Protocol, and
        transmitting the at least one second message over the network to the at least one Session Initiation Protocol end-user device to cause the at least one Session Initiation Protocol end-user device to perform the operation.

2. The telecommunications system of claim 1, wherein:
    the second computer system further performs the steps of:
        receiving at least one third message in the second message format over the network from at least one Session Initiation Protocol end-user device of the telecommunications system,
        translating the at least one third message from the second message format to form at least one fourth message in the first message format, and
        transmitting the at least one fourth message to the first computer system; and
    the first computer system further performs the steps of:
        receiving the at least one fourth message from the second computer system, and
        displaying information with the graphical user interface, performing an operation with the telecommunications system, or both, based on the fourth message.

3. An operator switchboard for a telecommunications system comprising a computer system comprising a processor operable to execute computer program instructions, a memory operable to store computer program instructions executable by the processor, and computer program instructions stored in the memory and executable to perform the steps of:
    displaying a graphical user interface comprising information and controls implementing a telecommunications system operator switchboard displaying information relating to Session Initiation Protocol end-user devices of the telecommunications system and the controls controlling operation of a plurality of Session Initiation Protocol end-user devices of the telecommunications system, receiving input with the graphical user interface, the input indicating an operation to be performed by at least one Session Initiation Protocol end-user device of the plurality of Session Initiation Protocol end-user devices, in response to receiving the input, generating at least one first message in a first non-standard or proprietary simple message format other than Session Initiation Protocol, Session Description Protocol, or a combination of Session Initiation Protocol and Session Description Protocol based on the received input, the at least one first message indicating the operation and at least one Session Initiation Protocol end-user device to perform the operation and representing a message in Session Initiation Protocol, Session Description Protocol, or a combination of Session Initiation Protocol and Session Description Protocol, and transmitting the at least one message to a server for translation from the first message format to form at least one second message in a second message format, the second message format being Session Initiation Protocol, Session Description Protocol, or a combination of Session Initiation Protocol and Session Description Protocol, and which, when transmitted by the server to the at least one Session Initiation Protocol end-user device causes the at least one Session Initiation Protocol end-user device to perform the operation to be performed.

4. The operator switchboard of claim 3, wherein:

the computer system further performs the steps of:

receiving from the server at least one third message in the first message format, the third message having been translated from a fourth message in the second message format from at least one Session Initiation Protocol end-user device of the telecommunications system; and displaying information with the graphical user interface, performing an operation with the telecommunications system, or both, based on the third message.

5. A server for a telecommunications system comprising a computer system comprising a processor operable to execute computer program instructions, a memory operable to store computer program instructions executable by the processor, and computer program instructions stored in the memory and executable to perform the steps of:

receiving at least one first message in a first non-standard or proprietary simple message format other than Session Initiation Protocol, Session Description Protocol, or a combination of Session Initiation Protocol and Session Description Protocol from an operator switchboard computer system, the at least one first message generated based on input received with a graphical user interface of the operator switchboard computer system displaying information relating to Session Initiation Protocol end-user devices of the telecommunications system and the controls controlling operation of a plurality of Session Initiation Protocol end-user devices of the telecommunications system, the input indicating an operation to be performed by at least one Session Initiation Protocol end-user device of the plurality of Session Initiation Protocol end-user devices, the at least one first message indicating the operation and at least one Session Initiation Protocol end-user device to perform the operation and representing a message in Session Initiation Protocol, Session Description Protocol, or a combination of Session Initiation Protocol and Session Description Protocol;

translating the at least one first message from the first message format to form at least one second message in a second message format, the second message format being Session Initiation Protocol, Session Description Protocol, or a combination of Session Initiation Protocol and Session Description Protocol, and transmitting the at least one second message to the at least one Session Initiation Protocol end-user device to cause the at least one Session Initiation Protocol end-user device to perform the operation.

6. The server of claim 5, wherein:

the computer system further performs the steps of:

receiving at least one third message in the second message format over the network from at least one Session Initiation Protocol end-user device of the telecommunications system, translating the at least one third message from the second message format to form at least one fourth message in the first message format, and transmitting the at least one fourth message to the operator switchboard computer system for displaying information with the graphical user interface, performing an operation with the telecommunications system, or both, based on the fourth message.

7. A computer program product for an operator switchboard for a telecommunications system comprising a non-transitory computer readable storage medium and computer program instructions, recorded on the non-transitory computer readable medium and executable by a processor, for performing the steps of:

displaying a graphical user interface comprising information and controls implementing a telecommunications system operator switchboard displaying information relating to Session Initiation Protocol end-user devices of the telecommunications system and the controls controlling operation of a plurality of Session Initiation Protocol end-user devices of the telecommunications system, receiving input with the graphical user interface, the input indicating an operation to be performed by at least one Session Initiation Protocol end-user device of the plurality of Session Initiation Protocol end-user devices, in response to receiving the input, generating at least one first message in a first non-standard or proprietary simple message format other than Session Initiation Protocol, Session Description Protocol, or a combination of Session Initiation Protocol and Session Description Protocol based on the received input, the least one first message indicating the operation and at least one Session Initiation Protocol end-user device to perform the operation and representing a message in Session Initiation Protocol, Session Description Protocol, or a combination of Session Initiation Protocol and Session Description Protocol, and transmitting the at least one message to a server for translation from the first message format to form at least one second message in a second message format, the second message format being Session Initiation Protocol, Session Description Protocol, or a combination of Session Initiation Protocol and Session Description Protocol, and which, when transmitted by the server to the at least one Session Initiation Protocol end-user device causes the at least one Session Initiation Protocol end-user device to perform the operation to be performed.

8. The computer program product of claim 7, further comprising the steps of:

receiving from the server at least one third message in the first message format, the third message having been translated from a fourth message in the second message format from at least one Session Initiation Protocol end-user device of the telecommunications system; and displaying information with the graphical user interface, performing an operation with the telecommunications system, or both, based on the third message.

9. A computer program product for server for a telecommunications system comprising a non-transitory computer readable storage medium and computer program instructions, recorded on the non-transitory computer readable medium and executable by a processor, for performing the steps of:

receiving at least one first message in a first non-standard or proprietary simple message format other than Session Initiation Protocol, Session Description Protocol, or a combination of Session Initiation Protocol and Session Description Protocol from an operator switchboard computer system, the at least one first message generated based on input received with a graphical user interface of the operator switchboard computer system displaying information relating to Session Initiation Protocol end-user devices of the telecommunications system and the controls controlling operation of a plurality of Session Initiation Protocol end-user devices of the telecommunications system, the input indicating an operation to be performed by at least one Session Initiation Protocol end-user device of the plurality of Session Initiation Protocol end-user devices and the at least one first message indicating the operation and at least one Session Initiation Protocol end-user device to perform the operation and representing a message in Session Initiation Protocol, Session Description Protocol, or a combination of Session Initiation Protocol and Session Description Protocol;

translating the at least one first message from the first message format to form at least one second message in a second message format, the second message format being Session Initiation Protocol, Session Description Protocol, or a combination of Session Initiation Protocol and Session Description Protocol, and transmitting the at least one second message to the at least one Session Initiation Protocol end-user device to cause the at least one Session Initiation Protocol end-user device to perform the operation.

10. The computer program product of claim 9, further comprising the steps of:

receiving at least one third message in the second message format over the network from at least one Session Initiation Protocol end-user device of the telecommunications system, translating the at least one third message from the second message format to form at least one fourth message in the first message format, and transmitting the at least one fourth message to the operator switchboard computer system for displaying information with the graphical user interface, performing an operation with the telecommunications system, or both, based on the fourth message.

* * * * *